United States Patent [19]

Lee et al.

[11] 4,071,709
[45] Jan. 31, 1978

[54] LINE CONDITIONING AND TRANSFER CIRCUIT

[75] Inventors: David Quon Lee, Chicago; Richard Michael Rovnyak, Schaumburg, both of Ill.

[73] Assignee: GTE Automatic Electric Laboratories Incorporated, Northlake, Ill.

[21] Appl. No.: 751,287

[22] Filed: Dec. 16, 1976

[51] Int. Cl.² .............................................. H04M 3/04
[52] U.S. Cl. ............................. 179/18 HB; 179/84 R
[58] Field of Search .............. 179/18 HB, 84 R, 84 A; 307/133, 135; 200/144

[56] References Cited

U.S. PATENT DOCUMENTS 3,720,793  3/1973  Hofmann ..................... 179/18 HB Primary Examiner—Thomas A. Robinson
Attorney, Agent, or Firm—Robert J. Black

[57] ABSTRACT

A circuit for electrically preconditioning a telephone line and switching an associated ringing generator on and off at the instant of opportune circuit conditions to eliminate circuit transients. The line circuit is switched by means of a relay so that an equipotential charge exists on either side of the switching contacts at closure and with zero current through the contacts at opening to eliminate suppression devices.

7 Claims, 1 Drawing Figure

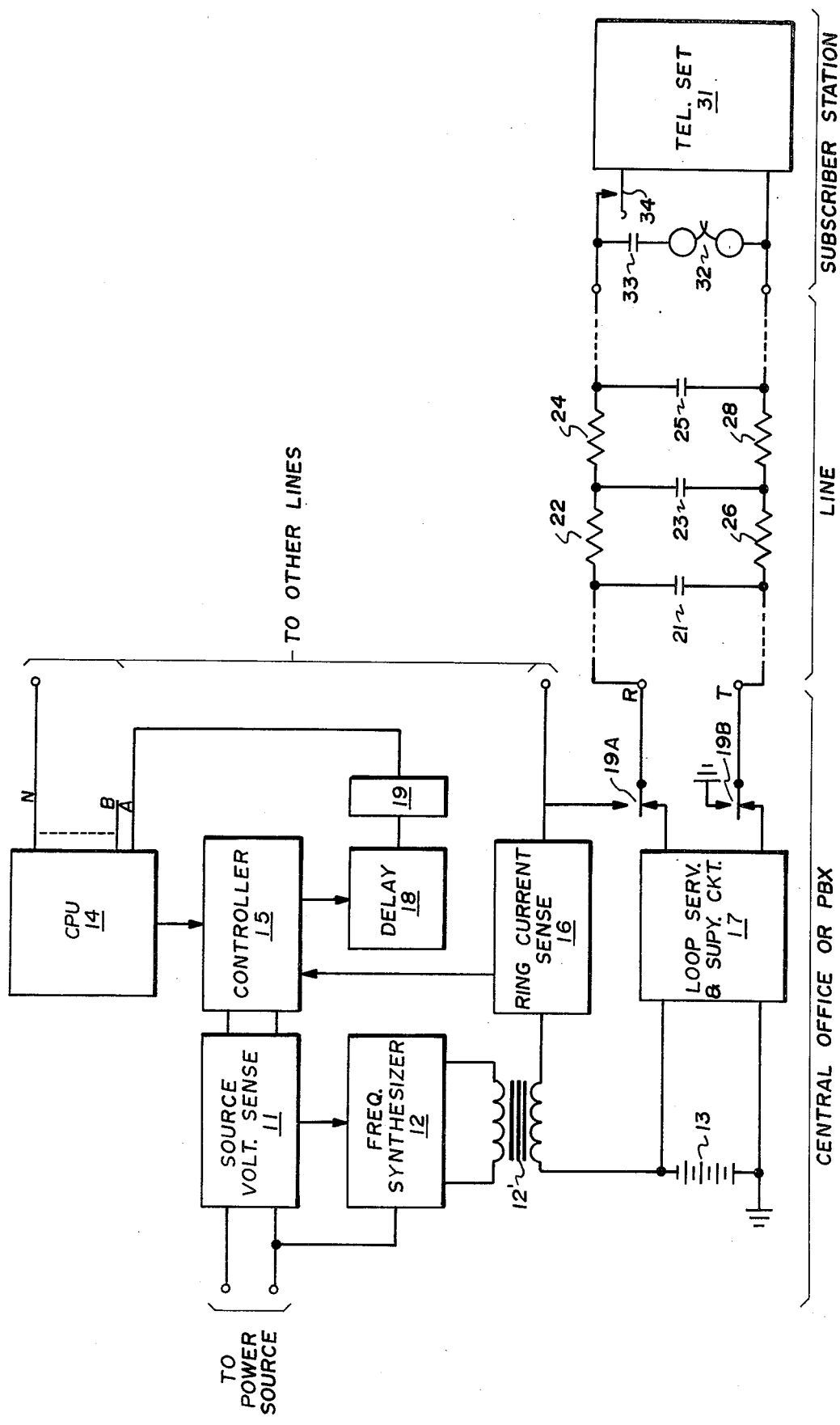

LINE CONDITIONING AND TRANSFER CIRCUIT

BACKGROUND OF THE INVENTION

1. Field of the Invention

The present invention pertains to telephone systems and more particularly to an arrangement for use in electronic telephone systems to precondition the telephone line to eliminate transients which might otherwise affect an electronic central office switching system or PBX.

2. Description of the Prior Art

Telephone systems have traditionally employed low frequency high voltage signals, usually superimplosed upon a DC bias, to activate electromechanical tone ringers, transformers, etc. for subscriber signalling. Interruption of such circuits normally occurs in the periodic application of ringing voltage and the transfer of the line circuit from the control and supervisory mode, to transmission status and vice versa. During such switching functions, reactive loads are interrupted and transient voltage and current spikes are generated.

Recently designed telephone switching systems make extensive use of electronic circuitry which is less tolerant of spurious transient signals than previous electromechanical systems. In order to protect such electronic switching systems against these false and unpredictable conditions, the use of transient suppression devices has been extensive. Such devices are required in several locations within the switching apparatus and on a per line basis. The requirement for transient suppression devices is expensive in terms of both cost and space. More frequently they affect the transmission quality or signal response requiring additional remedial action.

A number of electronic circuits have been developed for applying or removing ringing current from the telephone line. Such circuitry is disclosed in U.S. Pat. Nos. 3,187,106, 3,192,323, 3,378,643 and 3,668,331. None of the noted patents however deals with the conditioning and establishment of desirable line electrical states in order to prevent the generation of harmful transients, their purpose being to provide such features as interpretation and regulation of line supervisory signals and improving the efficiency of ring generator utilization.

Obviously a circuit that will prevent generation of transients is a far more desirable corrective measure, than to protect the equipment against such occurrences. Accordingly, it is the object of the present invention to describe an arrangement for both sensing the opportune circuit conditions and the switching of the circuit to accomplish inter and intra circuit rearrangement without inducing spurious electrical transient signals.

SUMMARY OF THE INVENTION

The present invention consists of circuitry for use in electronic switching systems whereby the line circuit is always switched with an equipotential charge on either side of the switching contacts at closure and zero current at opening. In this manner, neither transient capacitive charge currents or inductive transient voltages respectively are generated, thus allowing elimination of suppression devices. The circuitry of the present invention involves a ringing voltage generator, a source power voltage sensor and switch circuit, a ringing lead current sensor, a delay circuit and a controller. The detailed construction of said circuitry is not critical and can readily be designed by anyone skilled in the art familiar with the required function. The only specific requirement is that the ringing voltage generator have its secondary output DC connected instead of AC coupled when the telephone system uses the biased ring generator connection which is the more usual configuration, or that its secondary include a switchable biased DC voltage which is turned on when the AC ringing voltage is off and vice versa, this switchable bias being operated by the source power voltage sensor switch as well as the AC component when used in the following described manner.

In the present invention the controller synchronizes the activity of the various subcircuits and receives information entirely or in part from a system central processor unit. The degree of autonomy delegated to this circuit is not germane to the essence of the invention. To start, the ringing voltage genrator is energized as are the line relays. In this manner the lines selected by the central processor unit are signaled. The central processor unit clocks the ringing period and instructs the controller to terminate ringing. The controller observing the output of the ringing current sensor determines when the ringing current is at zero and immediately instructs the source voltage sensor switch to turn off the input power to the ringing voltage generator. The AC ringing cycle in this manner is turned off harmlessly and the line may be transferred back to the loop sensors. Before the transfer is made however the line capacity and tone ringer capacitors are charged (to a DC level and polarity) through ringing voltage generator's secondary resistance. This action eliminates the spurious charging currents switched by the line relay as well as misinterpretation of such current by the loop supervisory circuits. Accordingly, the delay circuit will hold back the de-energization of the line relay which transfers the line back to the loop conditions. (As noted above, in the event a ground connected ringing voltage generator is used, the output of the ringing voltage generator will include a DC bias supply appropriately turned on and off to accomplish this function.)

To initiate the ringing cycle, the ringing lead from the ringing voltage generator is at the DC potential of the ringing lead of the line (being maintained in this state through the DC connected secondary of the ringing voltage generator). The AC component of the ringing voltage generator is of course off. The central processor unit then instructs the controller to switch the line relay to the ringing mode. After a suitable delay to allow the line relay to operate and after any contact bounce has occurred, the controller will determine via the source voltage sensor, when the source voltage is zero, to then cause the source voltage sensor switch to turn on input power to the ringing voltage generator. In this manner the line and tone ringer load is turned on in such a manner as to create no spurious transients.

DESCRIPTION OF THE DRAWING

The accompanying drawing is a combined block and schematic diagram of a portion of a telephone system employing an arrangement for preventing generation of spurious transient voltages in accordance with the present invention.

DESCRIPTION OF THE PREFERRED EMBODIMENT

Referring now to the single sheet of accompanying drawings, it should be noted that a number of the components of the circuit of the present invention are shown in block form. The detailed circuitry of such component units does not form a portion of the invention, it being required only that the circuits perform the function described hereinafter. Design of such circuitry is well within the capability of those skilled in the design of electronic circuitry for use in telecommunication systems.

In the accompanying drawing a telephone line circuitrepresented by resistors 22, 24, 26 and 28 and capacitors 21, 23 and 25 is shown connected to a load comprised of a subscriber's station, including tone ringer 32 and an associated capacitor 33 and a telephone set 31 connected to the line via hook switch 34. Alternately additional ringers and telephone sets might also be connected to the same line. The indicated resistors and capacitors simulate the distributed low frequency R/C appearance of the line. The line at its other termination is connected at terminals T and R to a telephone central office or PBX which includes a source voltage sensing and switching circuit 11, a ringing voltage generator comprised of frequency synthesizer 12 and transformer 12', a source of DC potential 13, a telephone central processor unit 14, a controller circuit 15, a ringing current sensing circuit 16, a loop service and supervisory circuit 17, a delay circuit 18 and a line relay circuit 19 including associated make/break contacts 19A and 19B connected as shown in the drawing. The line relay 19 switches the subscriber line between the ringing voltage generator (frequency synthesizer 12 and transformer 12') and the loop service and supervisory circuit 17. In the present embodiment as shown, the ringing voltage generator is shown battery biased connected with a ringing current sensing circuit or detector 16 sensing the instant of zero AC ring lead current. The ringing current sensing circuit 16 is in series with the output of the ringing voltage generator. The ringing voltage generator consisting of frequency synthesizer 12 and associated transformer 12' is powered from a separate power source such as the 60 Hz-line power or from a portable generator. Its input however, is controlled by a solid state switching device such as a triac in the source voltage sense circuit 11. The source voltage sense circuit also contains integrally or separately a source voltage sensor for the purpose of indicating to controller circuit 15 when the input voltage is at its zero crossing moment.

The ringing voltage generator (frequency synthesizer 12 and transformer 12') being turned "on" and "off" with the switching of the line by relay 19 is coordinated by the controller circuit 15 acting in unison with the system central processor. The delay circuit 18 provides the necessary delay. However, appropriate delay could be included in the task assigned to the central processor unit thus eliminating the necessity for the delay circuit 18. As noted, additional lines may be connected with their included line relay connected in the manner shown to one of the other terminals (B through N) of the central processor unit and with connection to the loop through service and supervisory circuit and ring current sense circuits in the manner shown in the accompanying drawing.

While but a single embodiment of the present invention has been shown it will be obvious to those skilled in the art that numerous modifications can be made without departing from the spirit of the present invention and it shall be limited only by the scope of the claims appended hereto.

What is claimed is:

1. A telephone system including, a telephone line connected to at least one subscriber station including a ringer; a central switching system including a central processor unit, line supervisory means, and line relay means connected to said central processor unit normally connecting said line to said line supervisory means, and a ringing signal generator connectable to a power source; the improvement comprising: voltage sensing means connected between said ringing signal generator and said power source; and a control circuit including circuit connections to said line relay, to said voltage sensing means and to said central processor unit, initially operated in response to said central processor unit to connect said power source to said ringing signal generator through said voltage sensing means and to operate said line relay, whereby ringing current from said ringing signal generator is connected to said telephone line to operate said subscriber station ringer.

2. A telephone system as claimed in claim 1 wherein there is further included: current sensing means connected between said ringing signal generator and said line relay; said control circuit further operated in response to said central processor unit in response to determination by said current sensing means that ringing current is zero, to operate said voltage sensing means switch to disconnect said power source from said ringing voltage generator and restore said line relay, to reconnect said line to said line supervisory means.

3. A telephone system as claimed in claim 2 wherein: said control circuit is additionally operated in response to said central processor unit and in response to determination by said voltage sensing means that said power source is disconnected to operate said voltage sensing means switch to reconnect said power source to said ringing voltage generator whereby ringing current is again connected to said telephone line.

4. A telephone system as claimed in claim 1 wherein: said voltage sensing means includes a switch operable in response to said control circuit to connect said power source to said ringing voltage generator.

5. A telephone system as claimed in claim 1 wherein: said ringing voltage generator conprises signal frequency synthesizing means and transformer means coupling said frequency synthesizing means to said telephone line through said operated line relay.

6. A telephone system as claimed in claim 5 wherein: there is further included battery means normally connected to said telephone line through said loop supervisory means and further connected through said transformer means to said telephone line in response to operation of said line relay.

7. A telephone system as claimed in claim 1 wherein there is further included: delay means connected between said control circuit and said line relay, operable to delay operation of said relay in response to said control circuit.

* * * * *

UNITED STATES PATENT AND TRADEMARK OFFICE
CERTIFICATE OF CORRECTION

PATENT NO. : 4,071,709

DATED : January 31, 1978

INVENTOR(S) : David Q. Lee & Richard M. Rovnyak

It is certified that error appears in the above-identified patent and that said Letters Patent are hereby corrected as shown below:

Column 4, line 24, "1" should read --4--

Column 4, line 28, after "unit" insert --and--

Signed and Sealed this

Sixth Day of June 1978

[SEAL]

Attest:

RUTH C. MASON
*Attesting Officer*

DONALD W. BANNER
*Commissioner of Patents and Trademarks*